US011057320B2

(12) United States Patent
Mathur et al.

(10) Patent No.: US 11,057,320 B2
(45) Date of Patent: Jul. 6, 2021

(54) OPERATION FOR MULTIPLE CHAT BOTS OPERATION IN ORGANIZATION

(71) Applicant: Walmart Apollo, LLC, Bentonville, AR (US)

(72) Inventors: Yadu Mathur, Bangalore (IN); Revanth Chetluru, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/535,273

(22) Filed: Aug. 8, 2019

(65) Prior Publication Data
US 2020/0412671 A1 Dec. 31, 2020

(30) Foreign Application Priority Data

Jun. 27, 2019 (IN) .............................. 201941025518

(51) Int. Cl.
| | |
|---|---|
| H04L 12/58 | (2006.01) |
| G06N 5/02 | (2006.01) |
| H04L 29/08 | (2006.01) |
| H04L 29/06 | (2006.01) |
| G06F 40/205 | (2020.01) |

(52) U.S. Cl.
CPC ............ *H04L 51/02* (2013.01); *G06F 40/205* (2020.01); *G06N 5/02* (2013.01); *H04L 65/1066* (2013.01); *H04L 67/06* (2013.01)

(58) Field of Classification Search
CPC ..... H04L 51/02; H04L 65/1066; H04L 67/06; H04L 12/1813; G06F 40/205; G06N 5/02
See application file for complete search history.

(56) References Cited

U.S. PATENT DOCUMENTS

| | | | |
|---|---|---|---|
| 9,647,968 B2 * | 5/2017 | Smullen ................ | H04L 67/306 |
| 9,866,693 B2 * | 1/2018 | Tamblyn ................. | H04L 51/14 |
| 9,912,810 B2 * | 3/2018 | Segre ................... | H04M 3/5166 |
| 10,038,787 B2 * | 7/2018 | Tamblyn ............. | H04M 7/0045 |

(Continued)

FOREIGN PATENT DOCUMENTS

WO 2016191226 A1 12/2016

OTHER PUBLICATIONS

Wang Zheng Jane, "An IOT Solution that Connects Vehicle Users with Smart City Services Safely through a Unified Chatbot Interface", R&D, Embedded Software, ITO Solution, Jul. 27, 2017, 8 pages.

*Primary Examiner* — Jerry B Dennison

(57) ABSTRACT

An improved chat bot operation enables multiple teams to leverage a common bot deployment, rather than requiring each team to build and deploy their own. A context-aware operation identifies a user's context and selects a context file, from among a plurality of context files, to tailor actions and responses. Each team thus has a reduced workload in generating a context file rather than an entire bot deployment. An exemplary method includes: receiving a first chat content from a first chat session; determining a first context for the first chat content; selecting, based at least on the first context, a first context file from a plurality of context files; determining, based at least on the first chat content and the first context file, a first action for the chat bot, wherein determining the first action for the chat bot comprises parsing the first context file; and executing the first action.

20 Claims, 7 Drawing Sheets

(56) References Cited

U.S. PATENT DOCUMENTS

| | | | |
|---|---|---|---|
| 10,187,337 B2* | 1/2019 | Smullen | H04L 67/02 |
| 10,361,975 B2* | 7/2019 | Borsutsky | H04L 51/16 |
| 10,382,370 B1* | 8/2019 | Labarre | H04L 51/02 |
| 10,498,674 B2* | 12/2019 | Sagar | H04L 67/02 |
| 10,594,633 B2* | 3/2020 | Zucker | H04L 51/32 |
| 10,629,191 B1* | 4/2020 | Cheng | G06N 20/00 |
| 10,645,225 B1* | 5/2020 | Stoops | H04M 7/0045 |
| 10,659,403 B2* | 5/2020 | Smullen | H04L 69/14 |
| 10,666,583 B2* | 5/2020 | Yao | G06F 3/04817 |
| 10,679,631 B2* | 6/2020 | Hirzel | G06F 8/35 |
| 10,691,897 B1* | 6/2020 | Rajagopal | G10L 21/18 |
| 10,698,581 B2* | 6/2020 | Krishnan | G06Q 10/00 |
| 2003/0182394 A1* | 9/2003 | Ryngler | H04W 4/029 709/217 |
| 2009/0193131 A1* | 7/2009 | Shi | H04L 67/306 709/229 |
| 2011/0252150 A1* | 10/2011 | Chandrabasu | G06F 16/9535 709/228 |
| 2012/0221502 A1* | 8/2012 | Jerram | G06Q 30/0256 706/46 |
| 2014/0279050 A1* | 9/2014 | Makar | G06N 20/00 705/14.66 |
| 2014/0365885 A1* | 12/2014 | Carson | G06F 16/3344 715/708 |
| 2016/0035353 A1* | 2/2016 | Chen | G10L 15/1822 704/235 |
| 2016/0044380 A1* | 2/2016 | Barrett | H04N 21/812 725/53 |
| 2016/0117603 A1* | 4/2016 | Gaucher | G06N 20/00 706/12 |
| 2017/0048170 A1* | 2/2017 | Smullen | H04L 51/046 |
| 2017/0180276 A1* | 6/2017 | Gershony | H04L 51/18 |
| 2017/0180284 A1* | 6/2017 | Smullen | H04L 63/18 |
| 2017/0293834 A1* | 10/2017 | Raison | G06F 40/40 |
| 2017/0324866 A1* | 11/2017 | Segre | H04L 51/046 |
| 2017/0324867 A1* | 11/2017 | Tamblyn | H04L 51/24 |
| 2017/0324868 A1* | 11/2017 | Tamblyn | H04M 3/58 |
| 2017/0344889 A1* | 11/2017 | Sengupta | H04L 67/22 |
| 2017/0366480 A1* | 12/2017 | Sagar | H04L 67/02 |
| 2018/0039618 A1* | 2/2018 | Kumar | H04L 51/18 |
| 2018/0052842 A1* | 2/2018 | Hewavitharana | G06F 40/58 |
| 2018/0052884 A1* | 2/2018 | Kale | G06N 5/04 |
| 2018/0052885 A1* | 2/2018 | Gaskill | G06N 5/022 |
| 2018/0052913 A1* | 2/2018 | Gaskill | G06N 5/02 |
| 2018/0068031 A1* | 3/2018 | Hewavitharana | G06F 16/3329 |
| 2018/0102989 A1* | 4/2018 | Borsutsky | H04L 51/02 |
| 2018/0107685 A1* | 4/2018 | Kale | G06F 16/51 |
| 2018/0107917 A1* | 4/2018 | Hewavitharana | G06N 5/022 |
| 2018/0108066 A1* | 4/2018 | Kale | G06F 16/24522 |
| 2018/0139269 A1* | 5/2018 | Wu | H04L 67/16 |
| 2018/0139273 A1* | 5/2018 | Liu | H04L 67/1025 |
| 2018/0150524 A1* | 5/2018 | Anger | G06F 16/9535 |
| 2018/0174020 A1* | 6/2018 | Wu | G06N 3/08 |
| 2018/0183737 A1* | 6/2018 | Subbarayan | H04L 51/32 |
| 2018/0196796 A1* | 7/2018 | Wu | G06F 16/9024 |
| 2018/0212904 A1* | 7/2018 | Smullen | H04L 51/02 |
| 2018/0225365 A1* | 8/2018 | Altaf | G06F 16/3344 |
| 2018/0239837 A1* | 8/2018 | Wang | G06F 16/90335 |
| 2018/0248818 A1* | 8/2018 | Zucker | G06N 3/004 |
| 2018/0332169 A1* | 11/2018 | Somech | H04L 67/306 |
| 2019/0007228 A1* | 1/2019 | Vuskovic | G06Q 10/00 |
| 2019/0012390 A1* | 1/2019 | Nishant | G06F 16/248 |
| 2019/0042988 A1* | 2/2019 | Brown | G06Q 10/0631 |
| 2019/0065498 A1* | 2/2019 | Yuan | G06F 16/90332 |
| 2019/0103111 A1* | 4/2019 | Tiwari | G06F 16/3334 |
| 2019/0124020 A1* | 4/2019 | Bobbarjung | G06Q 20/123 |
| 2019/0124202 A1* | 4/2019 | Dubey | G06Q 50/01 |
| 2019/0138171 A1* | 5/2019 | Krishnan | G06F 8/34 |
| 2019/0138600 A1* | 5/2019 | Krishnan | G06F 8/34 |
| 2019/0180395 A1* | 6/2019 | Moretti | G06Q 50/182 |
| 2019/0188269 A1* | 6/2019 | Chandrasekaran | G05B 19/418 |
| 2019/0287537 A1* | 9/2019 | Hirzel | G10L 15/22 |
| 2019/0306252 A1* | 10/2019 | Lebedev | H04L 12/1827 |
| 2019/0349477 A1* | 11/2019 | Kotak | H04M 3/42221 |
| 2019/0356613 A1* | 11/2019 | Borsutsky | G06F 40/35 |
| 2019/0378024 A1* | 12/2019 | Singh | G06F 16/90332 |
| 2020/0005117 A1* | 1/2020 | Yuan | G06N 3/006 |
| 2020/0074311 A1* | 3/2020 | Li | G06N 5/02 |
| 2020/0081939 A1* | 3/2020 | Subramaniam | G06F 40/10 |
| 2020/0099633 A1* | 3/2020 | D'Agostino | G06F 3/0482 |
| 2020/0125901 A1* | 4/2020 | Pelov | H04L 51/02 |
| 2020/0143247 A1* | 5/2020 | Jonnalagadda | G06F 40/295 |
| 2020/0143265 A1* | 5/2020 | Jonnalagadda | G06N 3/0454 |
| 2020/0412671 A1* | 12/2020 | Mathur | G06F 40/205 |

* cited by examiner

OPERATION FOR MULTIPLE CHAT BOTS OPERATION IN ORGANIZATION

BACKGROUND

Chat bots can provide an effective way to make certain activities more productive, by leveraging natural language processing to automatically interpret questions and respond with appropriate answers. Often large teams within an organization generate and deploy bots to assist team members with tasks. However, different groups of people, such as different teams, may pose similar questions but need answers that are tailored to their specific group's or team's focus. Thus, different teams, even within a single larger organization, end up generating and deploying their own individually-tailored bots. Such a solution can be wasteful, as a significant portion of the effort required to generate and deploy the different bots is duplicative.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

An improved chat bot operation enables multiple teams to leverage a common bot deployment, rather than requiring each team to build and deploy their own. A context-aware operation identifies a user's context and selects a context file, from among a plurality of context files, to tailor actions and responses. Each team thus has a reduced workload in generating a context file rather than an entire bot deployment. An exemplary method includes: receiving a first chat content from a first chat session; determining a first context for the first chat content; selecting, based at least on the first context, a first context file from a plurality of context files; determining, based at least on the first chat content and the first context file, a first action for the chat bot, wherein determining the first action for the chat bot comprises parsing the first context file; and executing the first action.

BRIEF DESCRIPTION OF THE DRAWINGS

The disclosed examples are described in detail below with reference to the accompanying drawing figures listed below.

Figure 1:
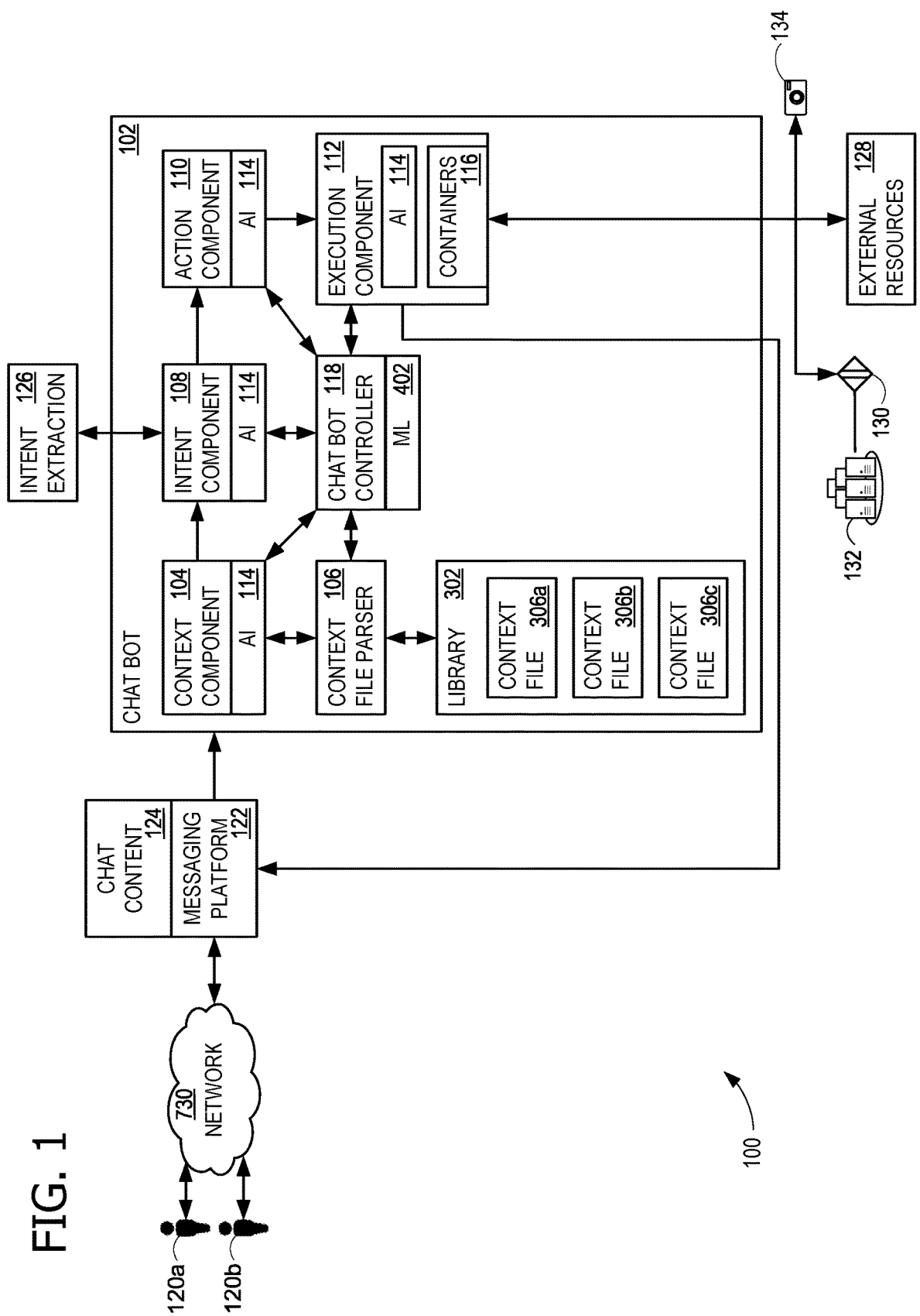
FIG. 1 illustrates an exemplary architecture for managing operations of a chat bot.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity, this implied leading clause is not repeated ad nauseum.

Chat bots can provide an effective way to make certain activities more productive, by leveraging natural language processing to automatically interpret questions and respond with appropriate answers. Often large teams within an organization generate and deploy bots to assist team members with tasks. However, different groups of people, such as different teams, may pose similar questions but need answers that are tailored to their specific group's or team's focus. Thus, different teams, even within a single larger organization, end up generating and deploying their own individually-tailored bots. Such a solution can be wasteful, as a significant portion of the effort required to generate and deploy the different bots is unnecessarily redundant.

Therefore, an improved chat bot operation enables multiple teams to leverage a common bot deployment, rather than requiring each team to build and deploy their own. A context-aware operation identifies a user's context and selects a context file, from among a plurality of context files, to tailor actions and responses. Each team thus has a reduced workload in generating a context file rather than an entire bot deployment. An exemplary method includes: receiving a first chat content from a first chat session; determining a first context for the first chat content; selecting, based at least on the first context, a first context file from a plurality of context files; determining, based at least on the first chat content and the first context file, a first action for the chat bot, wherein determining the first action for the chat bot comprises parsing the first context file; and executing the first action.

A single platform that can be used by multiple, disparately-focused teams, through multiple feeds or chat service platforms (e.g., Slack, Skype), reduces total development effort by eliminating duplication. Teams can customize context and functions for interacting with external resources, thereby tailoring actions to their needs, without the work involved in independent deployment of an entire custom bot solution. A mark-up language tool, such as YAML, and artificial intelligence (AI) can be leveraged for context-based issue resolution. A context file is parsed for context-related responses and functions, and AI identifies context when a user interacts with the chat bot. A machine language (ML) component learns in order to refine context over time.

When different teams use the chat bot, the bot determines the context and parses the context file associated with that context (e.g., the particular team) and responses based at least on the context. The context file is parsed for functions and uses connectors to send commands and receive results from external resources (e.g., GitHub, Jira, Splunk). Multiple flows can be run, each with its own context and cache. Multiple use cases can be realized, such as exploited, such as bot-to-bot interaction, each using its own context, and a customer-facing website chat bot with various contexts defined according to product department (e.g., clothing, household items, lawn and garden) and/or customer experience type (e.g., e-commerce, retail facility visit, credit and financing). Thus, the improved chat bot operation and management architecture disclosed herein provides multiple practical advantages.

FIG. 1 illustrates an exemplary architecture 100 for managing operations of a chat bot 102. Chat bot 102 includes a context component 104; a context file parser 106 that parses context files 306a-306c in a library 302; an intent component 108 that determines an intent expressed in chat content; an action component 110 that determines, based at least on the chat content and one of the context files, an action for chat bot 102 to use as a response; and an execution component 112 that executes the action. A plurality of users 120a and 120b interact with a messaging platform 122 (e.g., Slack, Skype) to generate chat content 124. Chat bot 102 can interact with multiple different teams, using multiple feeds, over multiple different messaging platforms, because architecture 100 and chat bot 102 are platform agnostic.

Context component 104 receives chat content 124 from a chat session on messaging platform 122, and determines a context for the chat. In some examples, context component 104 uses an AI component 114 to assist in determining context. In some examples, the team to which a user (e.g., one of user s 120a and 120b) belongs is used to determine context. In such examples, the context typically corresponds with an organization, such as a team or department, within a plurality of organizations in a larger organization (such as an enterprise operation), that is using chat bot 102 across the multiple teams. A chat bot controller 118, acting as a chat bot brain, controls the various components of chat bot 102 to receive content from a chat session; determine a context for the chat content; select, based at least on the context, a context file from a plurality of context files (e.g. context files 306a-306c in library 302); determine, based at least on the chat content and the selected context file, an action for chat bot 102, wherein determining the action for chat bot 102 comprises parsing the context file (e.g., with context file parser 106); and execute the action.

Each of context files 306a-306c includes data necessary to respond to user questions within chat content 124, according to the identified context, including methods and functions for interacting with external resources 128. In this manner, when different teams use chat bot 102, chat bot 102 has the proper context to interpret and answer (respond to) issues and questions specific to the user's team. In some examples, context files 306a-306c in library 302 are YAML files. YAML is a human-readable data serialization language, commonly used for configuration files, but applicable to a wide range of applications. In some examples, context file parser 106 is written in coffee script or python. Chat bot controller 118 can use multiple context files, so that upon chat bot 102 receiving chat content 124, chat bot 102 is able to capture the context of the user's question and leverage the specific context file that holds the tailored or customized information unique to the user's team.

In general, chat bot design relies on parsing techniques, pattern matching strategies and natural language processing (NLP) to represent the chat bot knowledge. Intent component 108 parses chat content 124 to extract entities to determine question intent. In some examples, chat content 124 is forwarded to an external intent extraction service 126. Intentions are named entities that can be matched by a recognition engine, typically defined through a set of training sentences input into an ML NLP framework. Matched intentions often carry information computed by extraction rules. In some examples, intent component 108 also uses AI component 114 for intent determination (extraction). The extracted intent is forwarded to action component 110, which, in some examples, also uses AI component 114.

Action component 110 selects an action as a response to a user's question expressed in chat content 124, based at least on chat content 12 and the parsed context file (e.g., one of context files 306a-306c). Actions are used to represent simple responses, such as sending a message back to the user, as well as additional operations such as querying external resources 128 and controlling data acquisition sensors 130 and 134. Actions are performed by execution component 112, and may be as simple as responding with textual information to messaging platform 122. However, execution component 112 also supports more advanced responses, such as inserting hyperlinks into a response message, and executing operations on or interfacing with external resources 128. A set of connectors 116 is provided for interfacing with external resources, using functions or methods defined within context files 306a-306c, and extracted by context file parser 106 for use by execution component 112. Connectors 116 can tie in with custom tools and third party tools, such as those available at Splunk, GitHub, and Jira (included in external resources 128). In some examples, execution component 112 controls one or more of data acquisition sensors 130 and 134 to collect data. As illustrated, data acquisition sensor 130 is part of an instrumented server or website 132, and data acquisition sensor 134 is another sensor (e.g., video or position) that can operate, for example, with an application that uses real-time data such as video imagery or coordinates for mapping. Execution component 112 receives and reports the result of executing a function, or reports the collected data, as needed, to the chat session ongoing on messaging platform 122. In some examples, the collected data includes the status of instrumented server or website 132 as determined by data acquisition sensor 130, or imagery collected by data acquisition sensor 134. The responses are sent by execution component 112 to messaging platform for viewing by the user. In some examples, execution component 112 also uses AI component 114 to assist in responding to the user, according to the determined action.

In some examples, an ML component 402 is operable to collect training data from responses received by execution component 112 from external resources 128 and from users via messaging platform 122, to enhance context files 306a-306c with additional functionality. In some examples, an ML component 402 is operable to use collected training data to further train AI component 114 to for example, improve or enhance context determination. Other aspects of AI component 114 can also be improved, such as for example, operations used by one or more of intent component 108, action component 110, and execution component 112.

Figure 2:
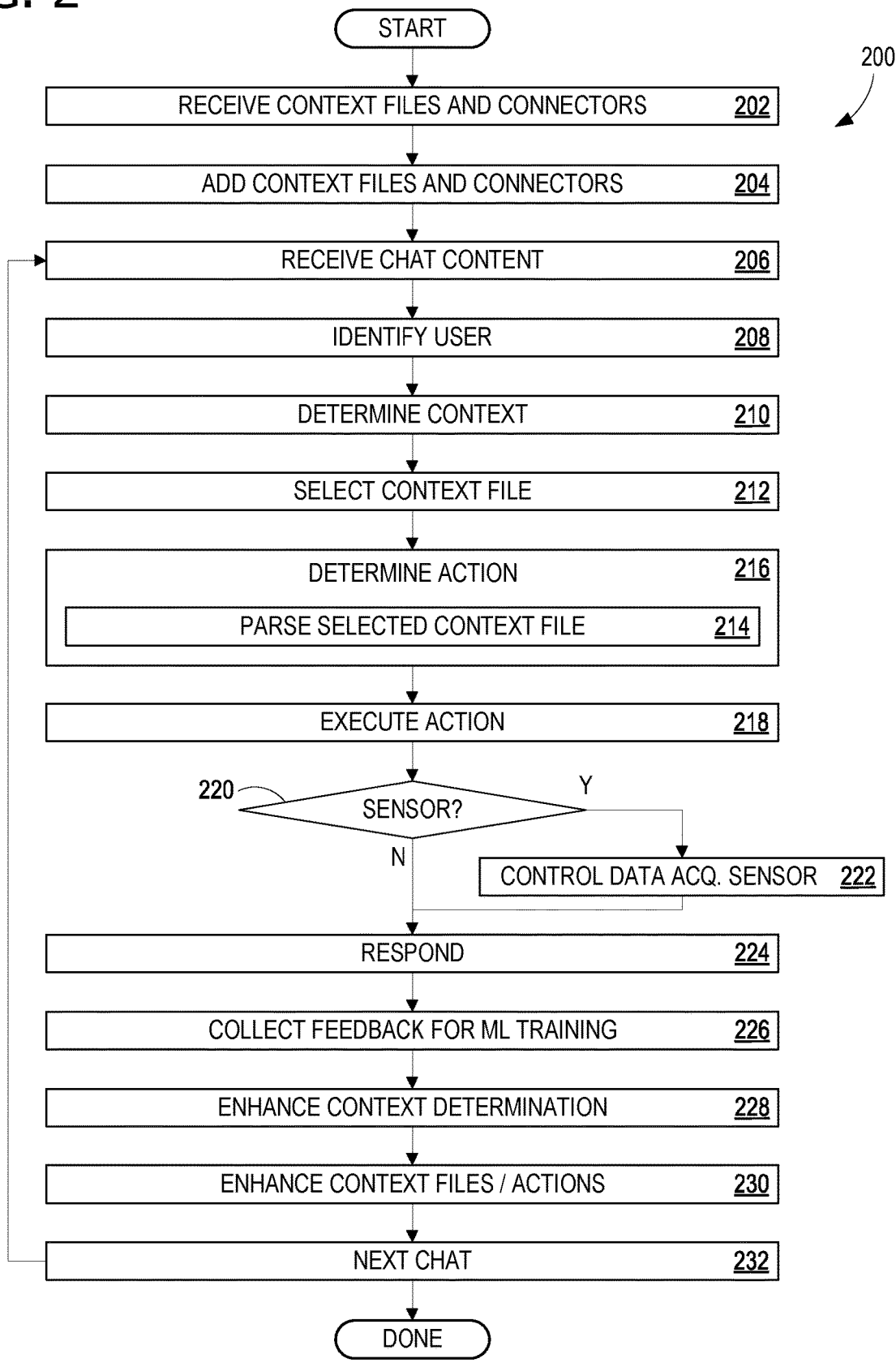
FIG. 2 shows a flow chart of exemplary operations associated with managing operations of a chat bot.

FIG. 2 shows a flow chart 200 of exemplary operations associated with managing operations of chat bot 102. In some examples, some or all of flow chart 200 is performed as computer-executable instructions on computing node 700 (see FIG. 7). Flow chart 200 commences with operation 202, which includes receiving context files and connectors. See, for example, flow chart 500 of FIG. 5, which describes the generation of context files and connectors. Operation 204 includes adding the context files to a plurality of context files (e.g. a context file library) within the bot and adding any new connectors into the execution component of the bot. Upon a chat session having new content (or a new chat session beginning), operation 206 includes receiving a chat content from a chat session. In a first pass through operation 206, this includes receiving a first chat content from a first chat session. In a subsequent pass through operation 206, this includes receiving a second chat content from a second chat session, different than the first chat session. It should be noted that operations 206-230 are repeated for each chat. In some examples, a particular bot deployment can be performing multiple versions of operations 206-230 in multiple parallel threads, simultaneously.

The user of the chat bot (e.g., the human or other bot who is communicating with the chat bot, for example chat bot 102) is identified in operation 208. Operation 210 includes determining a context for the chat. In some examples, the context is defined by the user, for example by a team to which the identified user belongs. In some examples, context is determined, at least partially, by the content of the chat. For example, a question within the chat content can be used to determine context for the chat. In some examples, determining a context for the chat comprises determining, using AI, a context for the chat. In such examples, AI takes into account the user's team and/or the question, when determining context. Operation 212 includes selecting, based at least on the context, a context file from a plurality of context files. In some examples, the context file comprises a function for accessing an external resource. Operation 214 then includes determining, based at least on the chat content and the context file, an action for the chat bot. In some examples, operation 214 includes operation 216. Operation 216 includes parsing the selected context file. In some examples, a parser will process text within the context file for context mapping the response and/or response options.

The chat bot executes the action in operation 218. In some examples, executing the action comprises executing a function (for accessing an external resource) and reporting a result of executing the function to the chat session, in operation 224. In some examples, a data acquisition sensor is activated to acquire data, such as for example an instrumented server being queried at to its status. Decision operation 220 determines whether activation of a sensor is required by the action. If so, executing the action includes controlling a data acquisition sensor to collect data in operation 222 and reporting the collected data to the chat session in operation 224. In some examples, however, operation 224 includes simpler responses, such as providing a textual response and/or a hyperlink to another resource (e.g., documentation or a website).

Operation 226 includes collecting feedback for ML training so that the bot can learn new functions to improve operations within a particular context, and/or improve context identification. Training data used feedback, such as whether the user satisfied with the responses or an external resource returned an error condition or syntax help. Operation 228 includes enhancing the plurality of context files with additional functionality using an ML component. In some examples, the context files can be automatically updated by ML, such as adding or updating functions. In some examples, a context file begins with approximately 10 to 15 defined actions in a YAML file, which are replaced with improvements, or added to. Operation 230 includes enhancing the AI context determination using an ML component. That is, in some examples, the bot's framework, which uses AI to determine context, is enhanced with training data. Operation 232 repeats operations 206-230 for additional chats.

Figure 3:
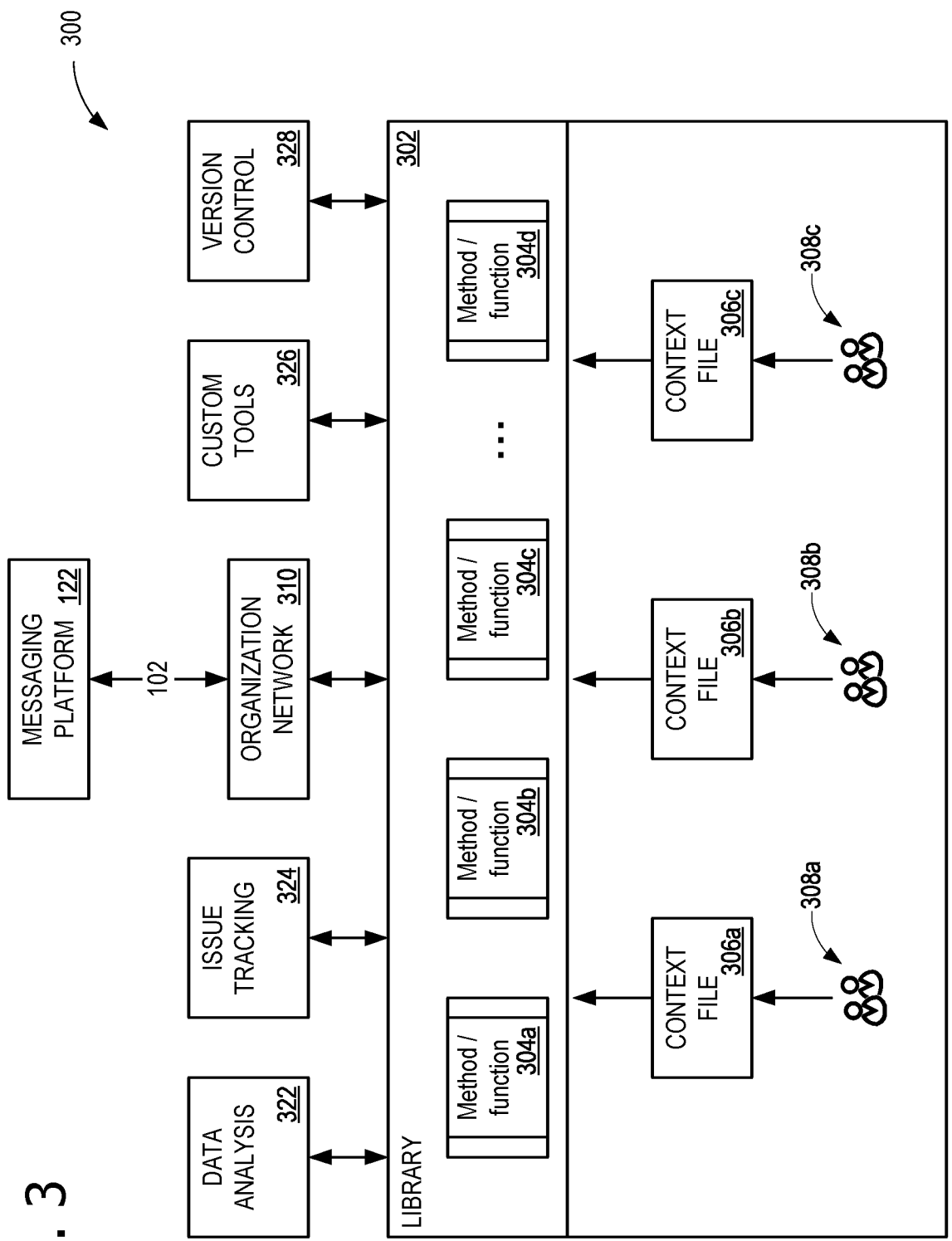
FIG. 3 illustrates an overview of an exemplary data flow related to chat bot operations.

FIG. 3 illustrates an overview of an exemplary data flow 300 related operations of chat bot 102. Library 302 is illustrated as containing multiple method/function classes 304a-304d. Various examples of method/function classes 304a-304d include Slack responses functions; Jira, GitHub, Splunk, and other third party connector functions; custom functions which are team specific; and AI or Spacy based NLP functions. As illustrated, context files 306a-306c are each created by a respective one of teams 308a-308c and loaded into library 302. An organization network 310 then deploys, hosts, and operates chat bot 102 interacting with messaging platform 122. Library 302 holds the data, methods, and functions necessary to interface with a data analysis service 322 (e.g., Splunk), an issue tracking service 324 (e.g., Jira), a version control service 328 (e.g., GitHub), and custom tools 326.

Figure 4:
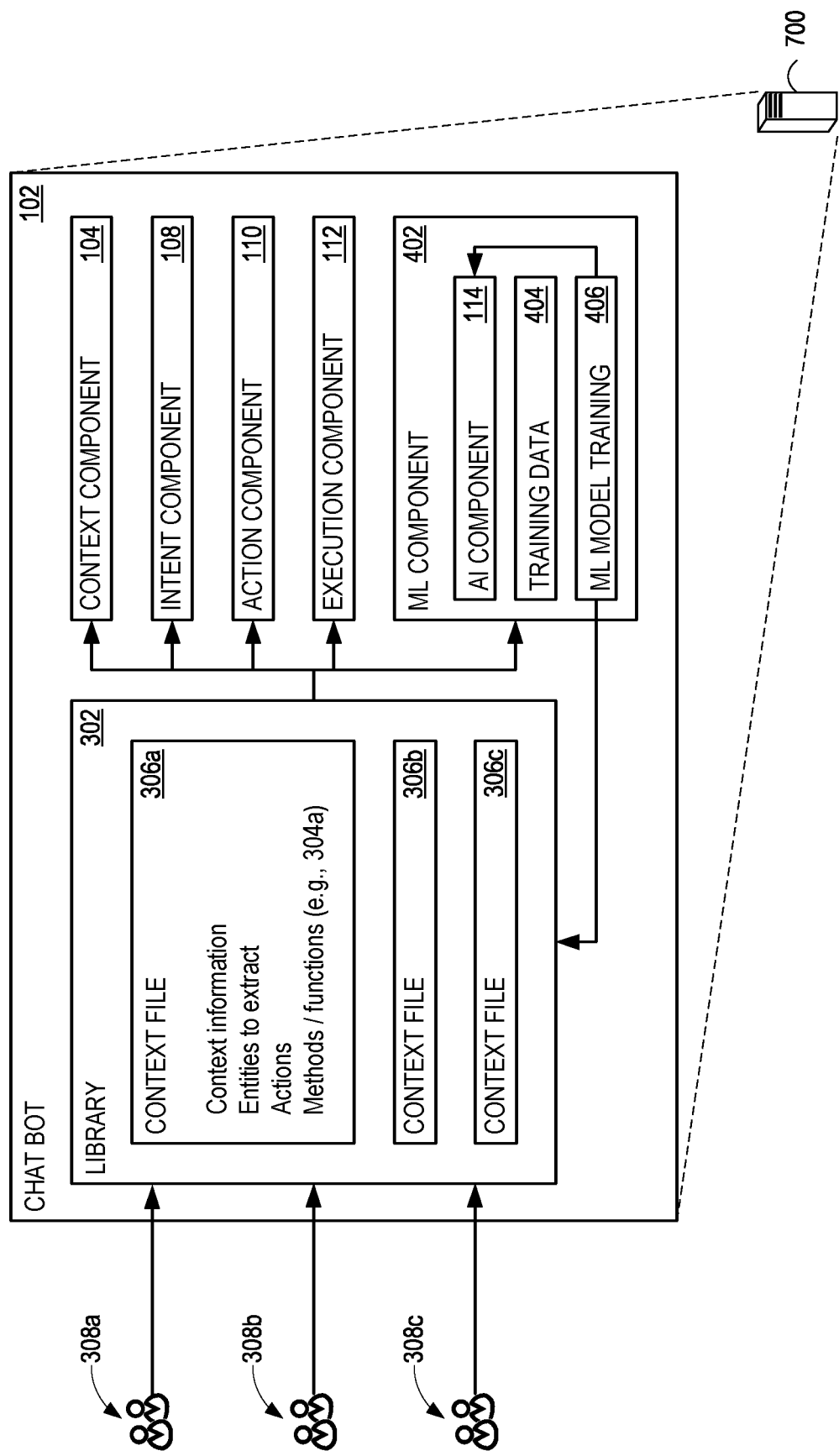
FIG. 4 illustrates an exemplary arrangement for managing operations of a chat bot.

FIG. 4 illustrates an exemplary arrangement 400 for managing operations of chat bot 102, and is an alternative view to data flow 300 of FIG. 3. Arrangement 400 illustrates the implementation of customized (tailored) contexts for each of teams 308a-308c, and indicates that chat bot runs on computing node 700. Each of teams 308a-308c produces and provides their own one of context files 306a-306c, which involves a lower level of effort than designing, producing, and employing an entire custom bot. As illustrated, context file 306a includes context information (which may include the context definition); entities to extract from chat content (e.g., chat content 124); actions for consideration by action component 110, and method/function classes (e.g., method/function class 304a of FIG. 3). Each of context component 104, intent component 108, action component 110, and execution component 112 is able to access the relevant information within library 302.

ML component 402 is illustrated as including AI component 114, although it should be understood that, in some examples, AI component 114 is distributed as separate components within one or more of context component 104, intent component 108, action component 110, and execution component 112. ML component 402 collects training data 404, for example by monitoring responses received by execution component 112 from external resources 128, and also user reactions to (e.g., further questions) responses sent by execution component 112 to messaging platform 122. Training data 404 is used by an ML training component 406 to enhance AI component 114 and library 302 (e.g., by adding to or improving one or more of context files 306a-306c.

Figure 5:
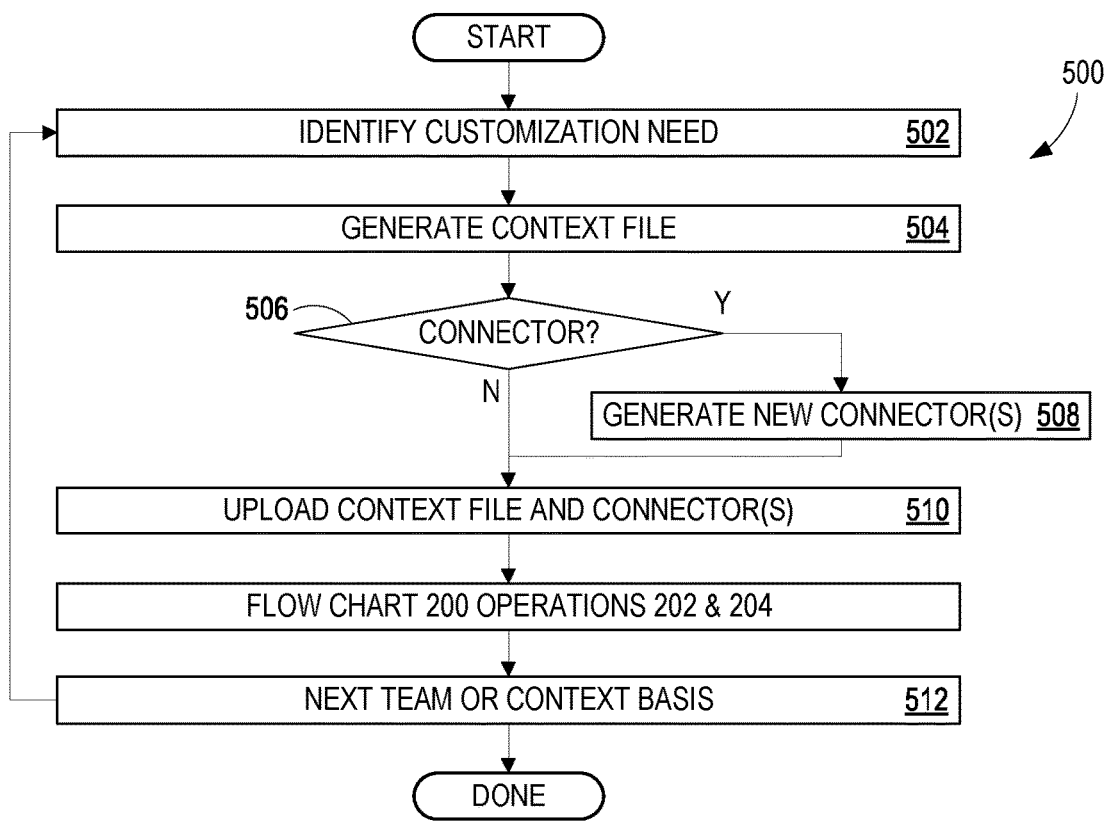
FIG. 5 shows another flow chart of exemplary operations associated with managing operations of a chat bot.

FIG. 5 shows a flow chart 500 of exemplary operations associated with managing operations of chat bot 102. In some examples, some or all of flow chart 500 is performed as computer-executable instructions on computing node 700 (see FIG. 7). Flow chart 500 commences with operation 502, which includes a team or other entity identifying customizations that are needed based on context. Operation 504 includes generating a context file for the context. In some examples, this includes generating one or more functions for context file, to enable accessing external resources. Decision operation 506 includes determining whether any new connectors are needed to access the external resources. If so, the new connectors are generated in operation 508.

Operation 510 includes uploading the context file and any new connectors. This is followed by operations 202 and 204 of flow chart 200 in FIG. 2. As indicated by operation 512, flow chart 500 is accessible by multiple teams, and so repeats for additional teams needing to define their own context, or for an entity that is defying multiple contexts for different departments or user experiences. At this point, the bot framework has the necessary customizations to respond to various users and/or use cases with tailored context-based responses.

Figure 6:
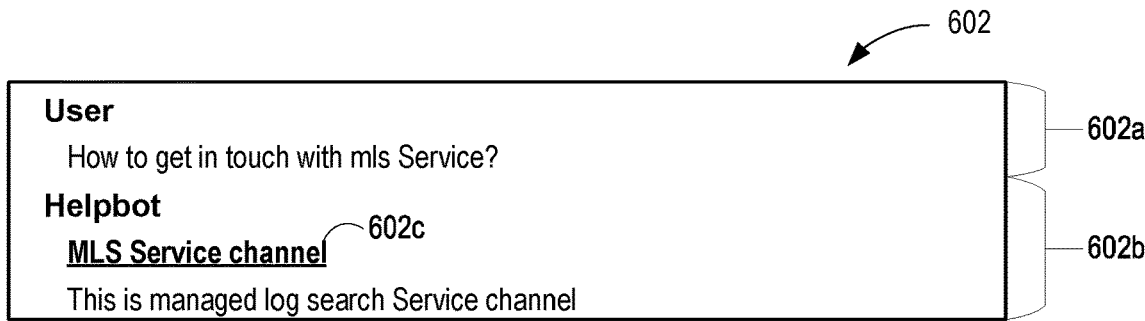
FIG. 6 shows portions of exemplary chat content.
Figure 6:
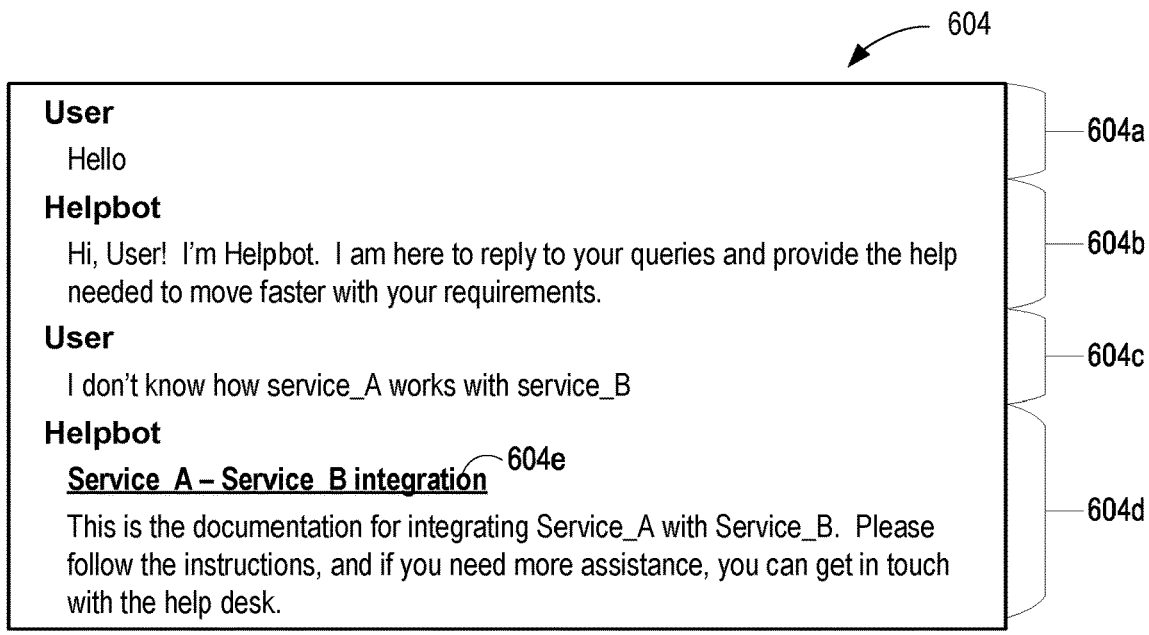
Figure 6:
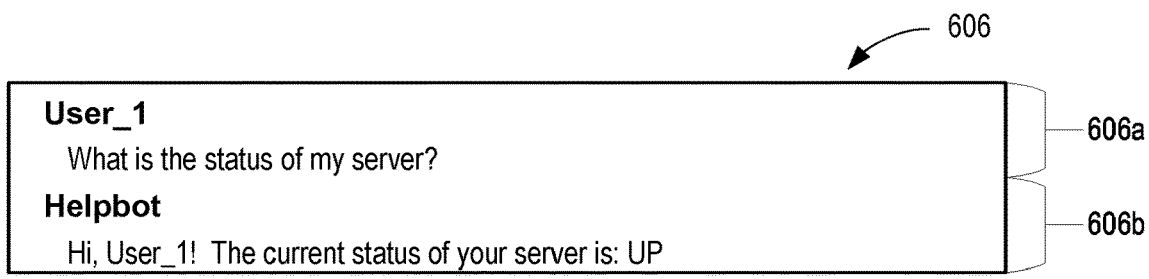
Figure 6:
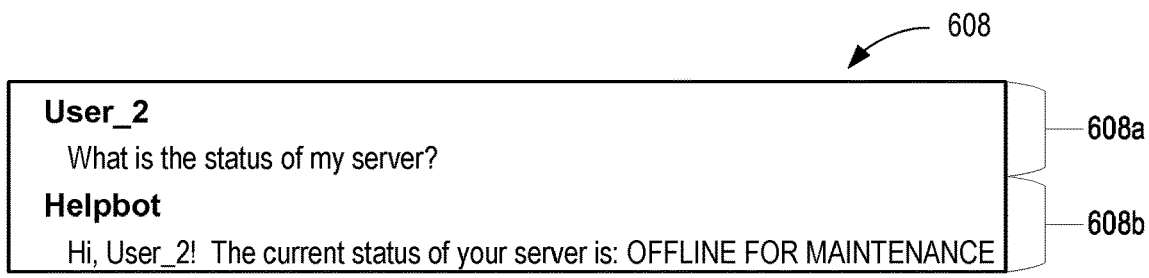

FIG. 6 shows portions of exemplary chat content. In a chat session 602, a user question 602a indicates a need to locate "mls Service." The chat bot, named "Helpbot" in this example, furnishes a response 602b that includes a hyperlink 602c and an explanation of the relevance of hyperlink 602c. In a chat session 604, a user's greeting 604a is met with a chat bot greeting 604b. A user question 604c indicates a need to learn about how a "Service A" and a "Service B" work together. A chat bot response 604d includes a hyperlink 602e for documentation on the subject of user question 604c.

Comparison of chat sessions 606 and 608 indicate how identical user questions 606a and 608b are answered differently, based on context. In chat session 606, the chat bot determines that User_1 is asking about the status of a first server, which is associated with User_1's team. In chat session 608, however, the chat bot determines that User_2 is asking about the status of a different server, which is associated with User_2's team. Thus, responses 606b and 608b indicate the status of different servers having different status.

Exemplary Operating Environment

Figure 7:
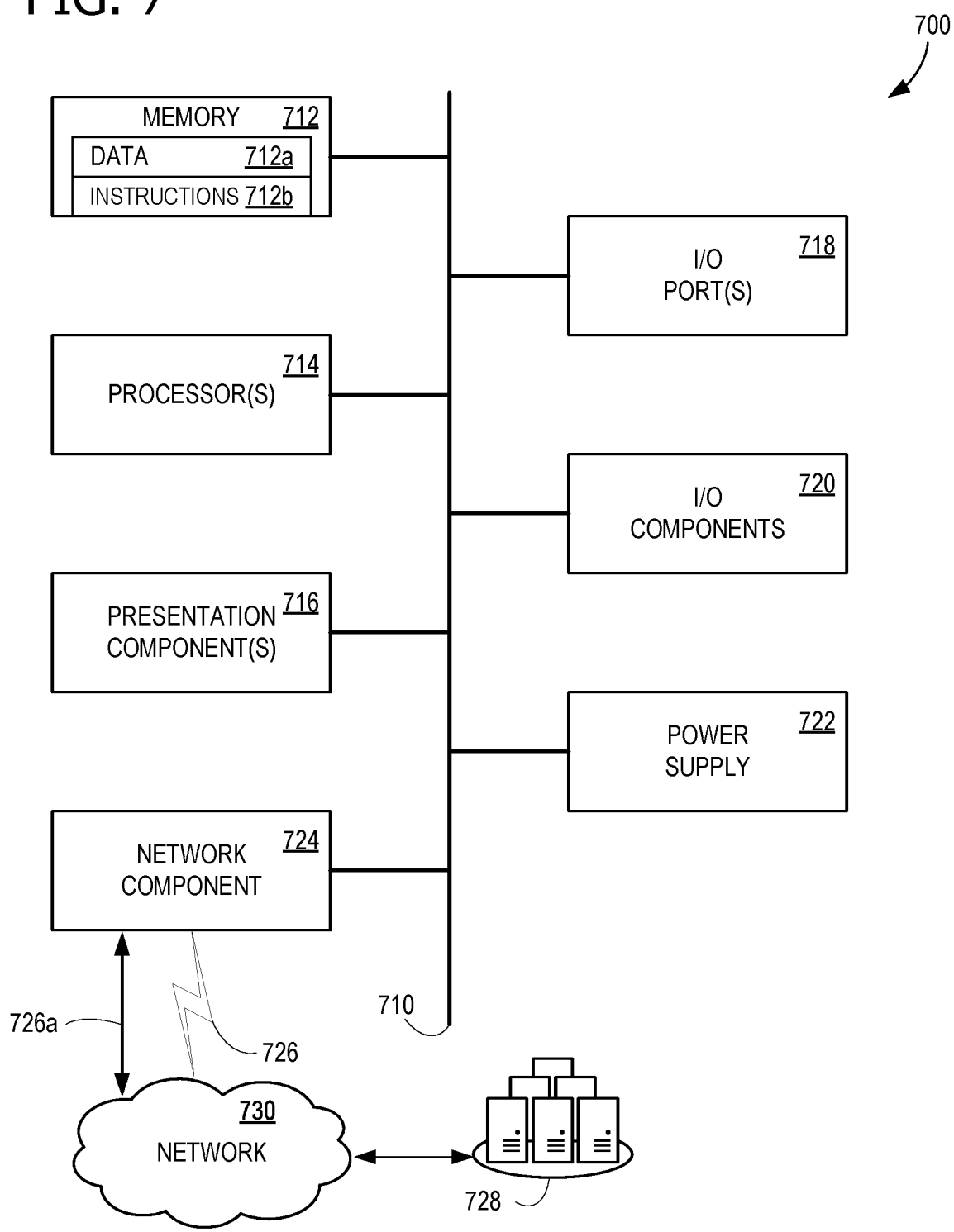
FIG. 7 is a block diagram of an example computing node for implementing aspects disclosed herein.

FIG. 7 is a block diagram of an example computing node 700 for implementing aspects disclosed herein and is designated generally as computing node 700. Computing node 700 is one example of a suitable computing environment and is not intended to suggest any limitation as to the scope of use or functionality of the invention. Neither should the computing node 700 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through communications network 730.

Computing node 700 includes a bus 710 that directly or indirectly couples the following devices: memory 712, one or more processors 714, one or more presentation components 716, input/output (I/O) ports 718, I/O components 720, a power supply 722, and a network component 724. Computing node 700 should not be interpreted as having any dependency or requirement related to any single component or combination of components illustrated therein. While computing node 700 is depicted as a seemingly single device, multiple computing nodes 700 may work together and share the depicted device resources. That is, one or more computer storage devices having computer-executable instructions stored thereon may perform operations disclosed herein. For example, memory 712 may be distributed across multiple devices, processor(s) 714 may provide housed on different devices, and so on.

Bus 710 represents what may be one or more busses (such as an address bus, data bus, or a combination thereof).

Although the various blocks of FIG. 7 are shown with lines for the sake of clarity, delineating various components can be accomplished with various other schemes. For example, a presentation component such as a display device can also be classified as an I/O component. Additionally, processors have internal memory. Thus, the diagram of FIG. 7 is merely illustrative of an exemplary computing node that can be used in connection with one or more embodiments. Distinction is not made between such categories as "workstation," "server," "laptop," "hand-held device," etc., as all are contemplated within the scope of FIG. 7 and the references herein to a "computing node" or a "computing device." Memory 712 may include any of the computer-readable media discussed herein. Memory 712 is used to store and access data 1212a and instructions 712b configured to carry out the various operations disclosed herein. In some examples, memory 712 includes computer storage media in the form of volatile and/or nonvolatile memory, removable or non-removable memory, data disks in virtual environments, or a combination thereof.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing node 700, or by a processor external to the client computing node 700. In some examples, processor(s) 714 are programmed to execute instructions such as those illustrated in the flowcharts discussed below and depicted in the accompanying drawings. Moreover, in some examples, processor(s) 714 represent an implementation of analog techniques to perform the operations described herein. For example, the operations may be performed by an analog client computing node 700 and/or a digital client computing node 700.

Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 700, across a wired connection, or in other ways. Ports 718 allow computing node 700 to be logically coupled to other devices including I/O components 720, some of which may be built in. Example I/O components 720 include, for example but without limitation, a microphone, keyboard, mouse, joystick, game pad, satellite dish, scanner, printer, wireless device, etc.

In some examples, network component 724 includes a network interface card and/or computer-executable instructions (e.g., a driver) for operating the network interface card. Communication between the computing node 700 and other devices may occur using any protocol or mechanism over any wired or wireless connection. In some examples, network component 724 is operable to communicate data over public, private, or hybrid (public and private) network 730 using a transfer protocol, between devices wirelessly using short range communication technologies (e.g., near-field communication (NFC), Bluetooth® branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing node 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for managing operations of a chat bot comprises: a processor; and a computer-readable medium storing instructions that are operative when executed by the processor to: receive a first chat content from a first chat session; determine a first context for the first chat content; select, based at least on the first context, a first context file from a plurality of context files; determine, based at least on the first chat content and the first context file, a first action for the chat bot, wherein determining the first action for the chat bot comprises parsing the first context file; and execute the first action.

An exemplary method of managing operations of a chat bot comprises: receiving a first chat content from a first chat session; determining a first context for the first chat content; selecting, based at least on the first context, a first context file from a plurality of context files; determining, based at least on the first chat content and the first context file, a first action for the chat bot, wherein determining the first action for the chat bot comprises parsing the first context file; and executing the first action.

An exemplary computer storage device has computer-executable instructions stored thereon for managing operations of a chat bot, which, on execution by a computer, cause the computer to perform operations comprising: receiving a first chat content from a first chat session; determining a first context for the first chat content; selecting, based at least on the first context, a first context file from a plurality of context files, wherein the first context file comprises a function for accessing an external resource; determining, based at least on the first chat content and the first context file, a first action for the chat bot, wherein determining the first action for the chat bot comprises parsing the first context file; executing the first action, wherein executing the action comprises: executing the function; and reporting a result of executing the function to the first chat session; generating, based at least on a second context, a second context file; receiving the second context file; adding the second context file to the plurality of context files; receiving a second chat content from a second chat session, different than the first chat session; determining the second context for the second chat content, the second context different than the first context; selecting, based at least on the second context, the second context file from the plurality of context files, the second context file different than the first context file; determining, based at least on the second chat content and the second context file, a second action for the chat bot, wherein determining the second action for the chat bot comprises parsing the second context file; executing the second action, wherein executing the second action comprises: controlling a data acquisition sensor to collect data; and reporting the collected data to the second chat session.

Alternatively, or in addition to the other examples described herein, examples include any combination of the following:

the first context corresponds with a first organization of a plurality of organizations using the chat bot;

the first context file comprises a function for accessing an external resource;
executing the first action comprises executing the function;
reporting a result of executing the function to the first chat session.
receiving a second chat content from a second chat session, different than the first chat session;
determining a second context for the second chat content, the second context different than the first context;
selecting, based at least on the second context, a second context file from the plurality of context files, the second context file different than the first context file;
determining, based at least on the second chat content and the second context file, a second action for the chat bot;
determining the second action for the chat bot comprises parsing the second context file;
executing the second action;
generating, based at least on the second context, the second context file;
receiving the second context file;
adding the second context file to the plurality of context files;
the plurality of context files comprises a plurality of YAML files;
a data acquisition sensor;
executing the first action comprises controlling a data acquisition sensor to collect data;
reporting the collected data to the first chat session;
determining a first context for the first chat content comprises determining, using AI, a first context for the first chat content; and
enhancing the plurality of context files with additional functionality using an ML component.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for managing operations of a chat bot, the system comprising:
   a processor; and
   a data acquisition sensor configured to acquire data of a status of an instrumented server of a user;
   a computer-readable medium storing instructions that are operative when executed by the processor to:
      receive a first chat content from a first chat session;
      identify an entity in the first chat session using the acquired data, wherein the user belongs to the entity;
      determine a first context for the first chat content using the status of the instrumented server of the user and the entity to which the user belongs;
      generate, based at least on the first context, a first context file from a plurality of context files previously provided by the entity, wherein the first context file comprises a function for accessing an executable, external resource;
      determine, based at least on the first chat content and the first context file, a first action for the chat bot, wherein determining the first action for the chat bot comprises parsing the first context file; and
      execute the first action.

2. The system of claim 1 wherein:
   the entity is a team within an organization deploying the chat bot,
   the first context corresponds with the team within the organization deploying the chat bot, and
   to generate the first context file, the processor is configured to generate functions to be performed by the context file.

3. The system of claim 1 wherein the function for accessing the executable, external resource is a custom tool or a third party tool, and
   wherein executing the action comprises:
      executing the function; and
      reporting a result of executing the function to the first chat session.

4. The system of claim 1 wherein the instructions are further operative to:
   receive a second chat content from a second chat session including a second entity, different than the first chat session with the entity;
   determine a second context for the second chat content, the second context different than the first context;
   generate, based at least on the second context, a second context file from the plurality of context files, the second context file different than the first context file;
   determine, based at least on the second chat content and the second context file, a second action for the chat bot, wherein determining the second action for the chat bot comprises parsing the second context file; and
   execute the second action.

5. The system of claim 4 wherein the instructions are further operative to:
   receive the second context file; and
   add the second context file to the plurality of context files.

6. The system of claim 1 wherein the plurality of context files comprises a plurality of YAML files.

7. The system of claim 1 wherein executing the first action comprises:
   controlling the data acquisition sensor to collect data; and
   reporting the collected data to the first chat session.

8. The system of claim 1 wherein determining a first context for the first chat content comprises determining, using artificial intelligence (AI), a first context for the first chat content.

9. The system of claim 1 wherein the instructions are further operative to:
enhance the plurality of context files with additional functionality using a machine learning (ML) component by improving the first context file or adding additional context files for the entity responsive to learning additional chat content received from the user during the first chat session,
wherein the additional chat content comprises additional questions received from the user responsive to the first action for the chat bot.

10. A method of managing operations of a chat bot, the method comprising:
receiving a first chat content from a first chat session;
acquiring data of a status of an instrumented server of a user;
identifying an entity in the first chat session using the acquired data, wherein the user belongs to the entity;
determining a first context for the first chat content using the status of the instrumented server of the user and the entity to which the user belongs;
generating, based at least on the first context, a first context file from a plurality of context files previously provided by the entity, wherein the first context file comprises a function for accessing an executable, external resource;
determining, based at least on the first chat content and the first context file, a first action for the chat bot, wherein determining the first action for the chat bot comprises parsing the first context file; and
executing the first action.

11. The method of claim 10 wherein:
the first context corresponds with a first organization of a plurality of organizations using the chat bot, and
generating the first context file includes generating functions to be performed by the context file.

12. The method of claim 10 wherein the first context file comprises a function for accessing an external resource, and wherein executing the action comprises:
executing the function; and
reporting a result of executing the function to the first chat session.

13. The method of claim 10 further comprising:
receiving a second chat content from a second chat session, different than the first chat session;
determining a second context for the second chat content, the second context different than the first context;
generating, based at least on the second context, a second context file from the plurality of context files, the second context file different than the first context file;
determining, based at least on the second chat content and the second context file, a second action for the chat bot, wherein determining the second action for the chat bot comprises parsing the second context file; and
executing the second action.

14. The method of claim 13 further comprising:
receiving the second context file; and
adding the second context file to the plurality of context files.

15. The method of claim 10 wherein the plurality of context files comprises a plurality of YAML files.

16. The method of claim 10 wherein executing the first action comprises:
reporting the acquired data to the first chat session.

17. The method of claim 10 wherein determining a first context for the first chat content comprises determining, using artificial intelligence (AI), a first context for the first chat content.

18. The method of claim 10 further comprising:
enhancing the plurality of context files with additional functionality using a machine learning (ML) component.

19. One or more computer storage devices having computer-executable instructions stored thereon for managing operations of a chat bot, which, on execution by a computer, cause the computer to perform operations comprising:
receiving a first chat content from a first chat session;
acquiring data of a status of an instrumented server of a user;
identifying an entity in the first chat session using the acquired data, wherein the user belongs to the entity;
determining a first context for the first chat content using the status of the instrumented server of the user and the entity to which the user belongs;
generating, based at least on the first context, a first context file from a plurality of context files previously provided by the entity, wherein the first context file comprises a function for accessing an executable, external resource;
determining, based at least on the first chat content and the first context file, a first action for the chat bot, wherein determining the first action for the chat bot comprises parsing the first context file;
executing the first action, wherein executing the first action comprises:
executing the function; and
reporting a result of executing the function to the first chat session;
generating, based at least on a second context, a second context file;
receiving the second context file;
adding the second context file to the plurality of context files;
receiving a second chat content from a second chat session, different than the first chat session;
determining the second context for the second chat content, the second context different than the first context;
selecting, based at least on the second context, the second context file from the plurality of context files, the second context file different than the first context file;
determining, based at least on the second chat content and the second context file, a second action for the chat bot, wherein determining the second action for the chat bot comprises parsing the second context file;
executing the second action, wherein executing the second action comprises:
controlling a data acquisition sensor to collect data; and
reporting the collected data to the second chat session.

20. The one or more computer storage devices of claim 19 wherein determining a first context for the first chat content comprises determining, using artificial intelligence (AI), a first context for the first chat content, and wherein the operations further comprise:
enhancing the plurality of context files with additional functionality using a machine learning (ML) component.

* * * * *